Oct. 6, 1925.

J. V. BLOMQUIST ET AL

STEAM GENERATOR

Filed Aug. 11, 1923

1,556,143

Inventors
J.V. Blomquist
K.F. Wessblad
by Langner, Parry, Card & Langner
Attys.

Patented Oct. 6, 1925.

1,556,143

UNITED STATES PATENT OFFICE.

JOHAN VIKTOR BLOMQUIST AND KARL FREDRIK WESSBLAD, OF STOCKHOLM, SWEDEN.

STEAM GENERATOR.

Application filed August 11, 1923. Serial No. 656,832.

*To all whom it may concern:*

Be it known that we, JOHAN VIKTOR BLOMQUIST and KARL FREDRIK WESSBLAD, both subjects of the King of Sweden, and residing at Lastmakaregatan 18, Stockholm, Sweden, have invented new and useful Improvements in Steam Generators, of which the following is a specification.

This invention relates to improvements in steam generators consisting of tubular elements containing rotary layers of water, such tubular elements being arranged in a common furnace. Steam generators of this type are principally used for extremely high pressures. The object of the invention is to make the interior of the tubular elements easily accessible. Hitherto the tubular elements of such steam generators have been provided with for instance threaded bottoms or heads welded to the shell of the element and carrying water inlet, steam outlet and bearing members, but by such an arrangement the interior of the tubular elements will become unaccessible for inspection, cleaning, etc. In earlier constructions of steam generators with rotary tubular elements, intended to be used for comparatively low pressures, it has been possible to make the diameter of the elements comparatively large so that space for manholes on the same has been available. In steam generators for extremely high pressures, however, the diameter of the rotary tubular elements for reasons easily accounted for must be kept comparatively small, and thus it is not possible to provide manholes or the like large enough to make an inspection and cleaning of the tubular elements effective.

According to the present invention one or both of the heads of the tubular elements are formed into loose covers easily removable, said covers preferably being centered to the tube and carrying the necessary devices for water inlet, steam outlet and journalling. After the removal of these covers the whole inner surface of the tubes will be accessible for an effective inspection and cleaning.

The invention is illustrated on the accompanying drawing in two different forms, each view presenting the respective boiler in longitudinal section.

Figure 1:
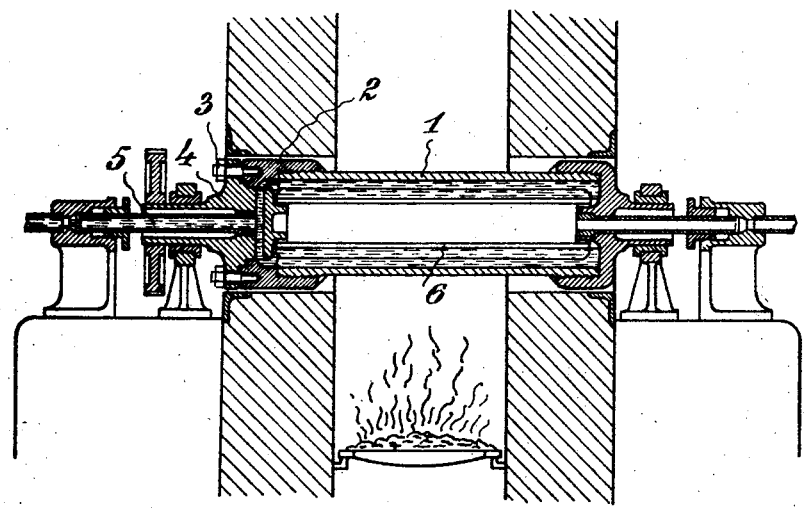

According to Fig. 1 the rotary tubular element 1 has a collar 2 which as shown on the drawing is threaded and welded on the tube, though it is obvious that the same also may be fastened in any other suitable way, for instance, by pressing, riveting or the like. The collar may also be integral with the tube. To this collar a cover 4 is attached by means of screws 3, said cover forming one of the ends of the tube. In the cover 4, which is centered at the tube and provided with a suitable tightening device, the water inlet 5 to the rotary tubular element is also provided as well as the end journal of the tube. At inspection or cleaning of the tube or for inserting and removing carriers 6 that may be provided in the tube for causing the water to take part in the rotation, the cover 4 is removed from the tube, whereafter the interior of the same will be easily accessible.

Figure 2:
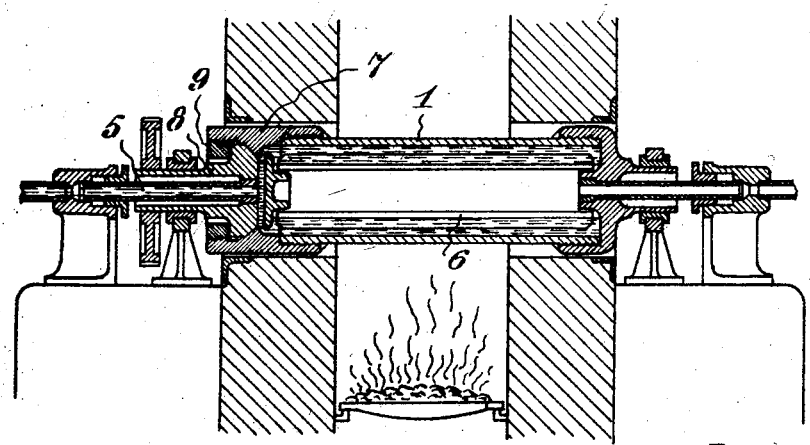

Fig. 2 shows another form of the invention in which the tube is also provided with a collar 7, while the cover 8 is kept in its place by a nut 9 screwed into the collar 7.

The devices described above are in Figs. 1 and 2 only shown at the end of the rotary tubular element where the water inlet is provided, but obviously the same arrangement may be used at the opposite ends of the tubes where the steam outlets are provided or if so required at both ends of the tubes.

What we claim as our invention, and desire to secure by Letters Patent is:—

A high pressure steam generator, comprising, a rotary tubular element, the element having two ends, a cover fixed to one of the ends, a hollow journal carried by the cover, an annular sleeve shaped member fixed to the other end of the element and provided with a seat, a removable cover formed to fit the seat, a hollow journal carried by the removable cover, and means for removably and tightly connecting the removable cover to the sleeve shaped member.

In testimony whereof, we have signed our names to this specification.

JOHAN VIKTOR BLOMQUIST,
KARL FREDRIK WESSBLAD.